Figure 1:
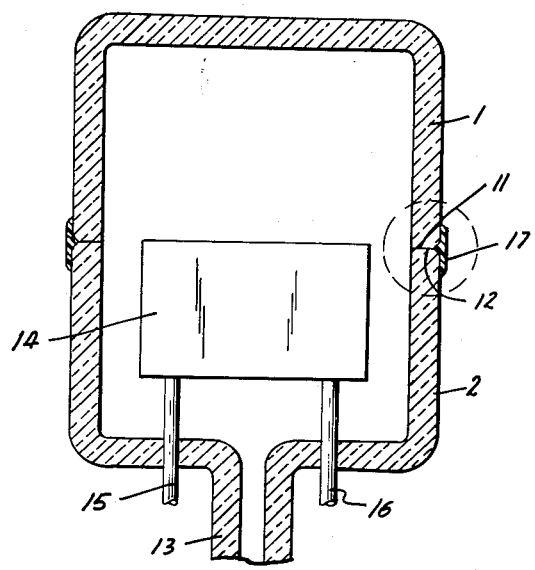

July 31, 1956   J. BLEUZE ET AL   2,756,892
HIGH VACUUM DISCHARGE TUBE
Filed April 14, 1952   3 Sheets-Sheet 1

INVENTORS:
Jacques Bleuze and
BY: Pierre Dussaussoy
Michael S. Striker
agt.

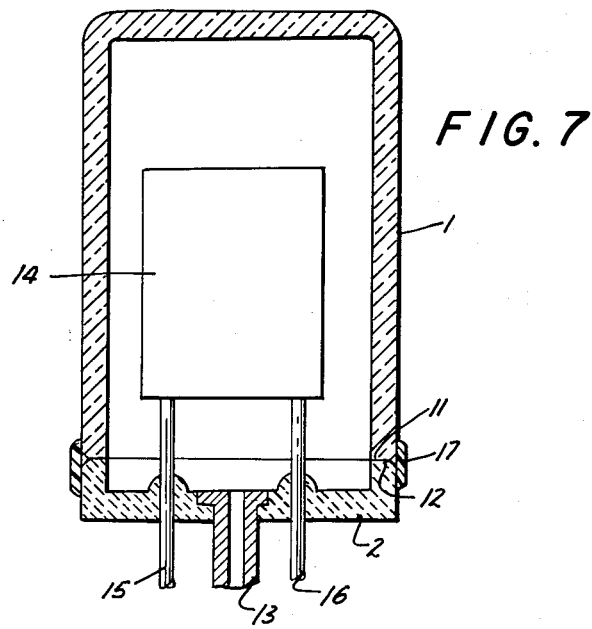
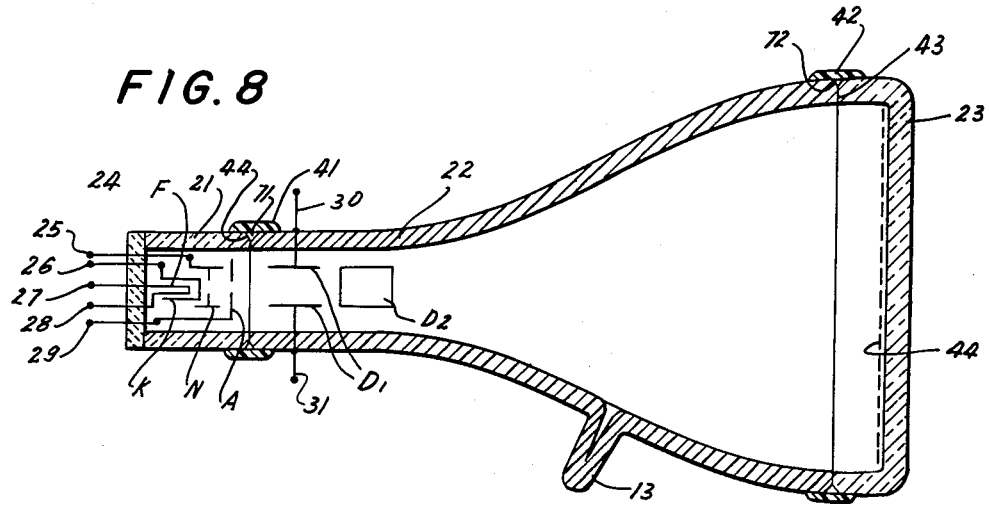

United States Patent Office 2,756,892
Patented July 31, 1956

2,756,892

HIGH VACUUM DISCHARGE TUBE

Jacques Bleuze and Pierre Dussaussoy, Paris, France, assignors to Societe Francaise Radio-Electrique, a corporation of France Application April 14, 1952, Serial No. 282,216

Claims priority, application France April 19, 1951

18 Claims. (Cl. 220—2.1)

The invention relates to the manufacturing of vacuum tight envelopes such as those of electron tubes.

It is well known that the pieces of the envelopes such as those of radio tubes are sealed with one another by two types of joints:

The most used joints are of the "matched" type, in which the constitutive pieces to be joined, present the same expansion coefficient. These pieces are usually sealed by fusing together the edges of the pieces, whereby the edges are heated to a high temperature, up to the vicinity of the softening temperature of the materials of the pieces. Another way of making such joints consists in using soft mineral glasses called "enamels" which must present the same expansion coefficient as that of the pieces to be sealed. Such an enamel is applied across the surfaces of the pieces to be joined and, after assembling these pieces and bringing the coats of said enamel in contact with each other, the assembly is heated up to the softening temperature of this enamel which melts and forms a seal interposed between the edges of the pieces. The purpose of this interposed enamel seal is to ensure the tightness of the joint and to hold the pieces together.

The known "unmatched" type joints between pieces presenting very different expansion coefficients are realized by using a metallic piece presenting a very thin and elastic edge which is sealed to the edge of the opposite piece, which is commonly of glass, by melting this latter edge or by using a coat of the above mentioned enamel. Such a seal does not crack if temperature variations occur, since the said thinned elastic edge withstands and follows the deformations resulting from the difference of the expansion of the pieces.

But, in the manufacturing of vacuum tight envelopes of electron tubes, the realization of these joints presents many disadvantages, such as the deformation of the pieces during the sealing process in which the edges of the pieces are heated to the softening point or in which an interposed layer of the said enamel is melted. In this case, it is very difficult to keep constant the predetermined geometrical dimensions and to maintain the position of the pieces of the said envelopes. Moreover, the manufacturing of the said tubes, as it is known, necessitates a step of degassing which consists in baking the tube at about 400° C. and simultaneously evacuating the tube to a high vacuum. It is therefore obvious that the seal must be made before the degassing and, the heating operation during the making of the seal may cause oxidation of the electrodes of the tube and particularly of the electron emitting cathode.

More particularly, the above mentioned unmatched type joints are only realizable with a metallic piece such joints present a low mechanical strength and are very difficult to realize, these disadvantages being due to the necessity of making a very thin edge of the said metallic piece.

An important object of the invention is a process of making unmatched joints in high vacuum envelopes which are to be submitted to a degassing operation.

Another object of the invention is a process of manufacturing of demountable joints in said envelopes allowing the reemployement of pieces of these envelopes.

A very important object of the invention is the realization of unmatched demountable joints presenting the mechanical strength of a matched joint and which are very easy to disassemble.

An object of the invention is the high vacuum vessel such as an electron tube, realized by using this process.

According to the invention, the process comprises polishing to an optical degree the edges of the pieces of the envelope, assembling the envelope by bringing the polished surfaces of the said edges in hermetic contact, evacuating the envelope to a high vacuum, submitting this envelope still under evacuation to a temperature sufficient to ensure the degassing, but substantially lower than the temperature at which the polished surfaces may directly seal to one another and at which any deformation of the parts of the envelope may occur, cooling the envelope, applying on the edges of the envelope a plastic vacuum tight material which adheres tightly on the said edges and forms a hermetic joint around the contact surfaces.

The said plastic material may be a polymerisable "silicone" type compound.

The pieces having largely different thermal expansion coefficients are ground and polished so as to realize abutting polished surfaces which may glide over one another if temperature variations occur, while maintaining a hermetic contact. The shapes of these surfaces are plane or spherical with different radii.

In view of making a demountable tube in which the said polymerized "silicone" joint may be easily removed, the edges are coated with a supplementary material which surrounds the said contact and avoids the penetration of the polymerisable "silicone" coat into the said contact.

This supplementary material may be a silicone type oil.

According to a feature of the invention, the edges of the pieces are ground so as to form, after being assembled, a groove surrounding said contact of the polished surfaces, the said supplementary material being disposed in this groove. The invention may best be understood by reference to the following description taken in connection with the accompanying drawings in which:

The Figure 1 shows schematically, in sectional view, a vacuum tight envelope realized according to the invention.

Figure 2:
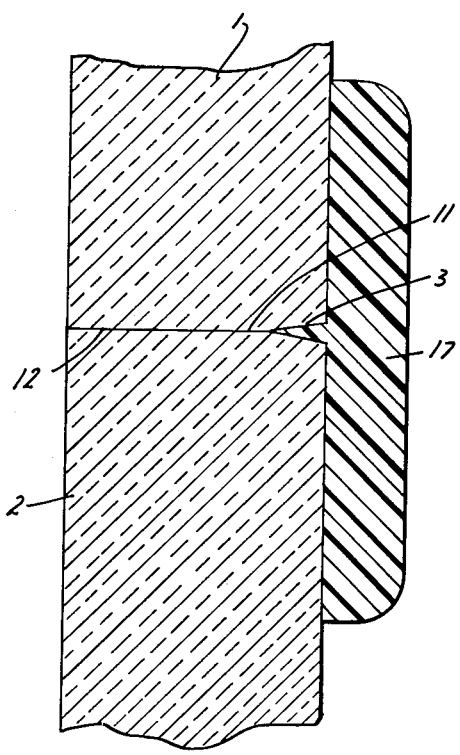

The Figure 2 is a magnified view of the joint which is surrounded by a dotted circle in Figure 1.

Figure 3:
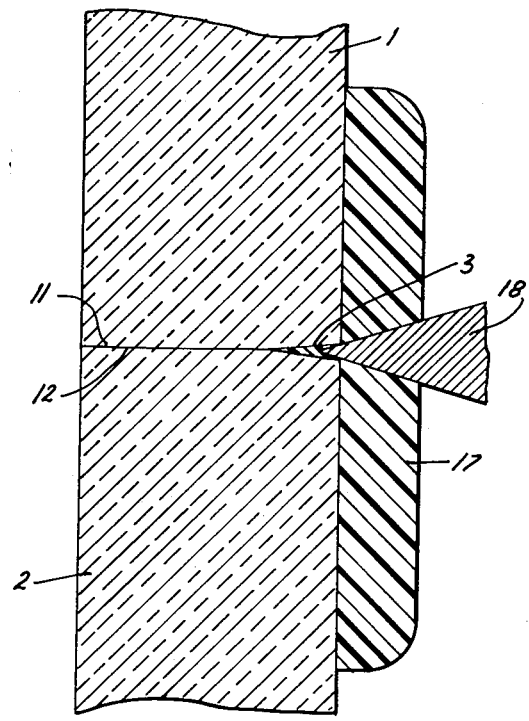

The Figure 3 shows the joint of the Fig. 2 during the demounting operation.

Figure 4:
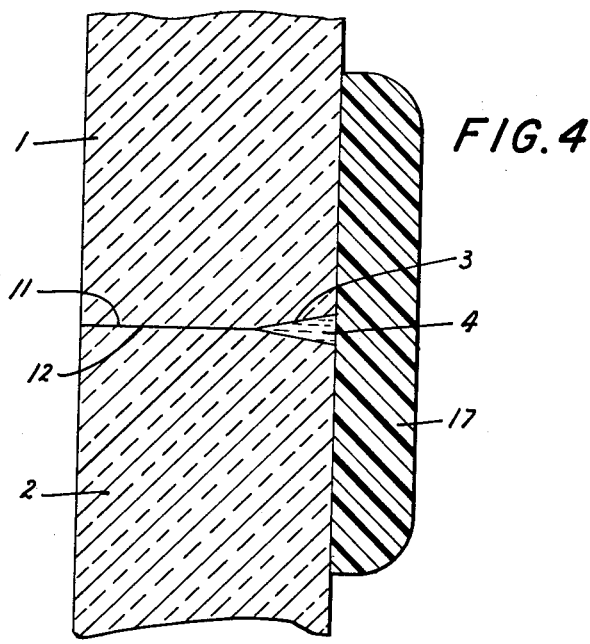

The Figure 4 is a magnified view of a joint comprising supplementary means enabling the demounting operation.

Figure 5:
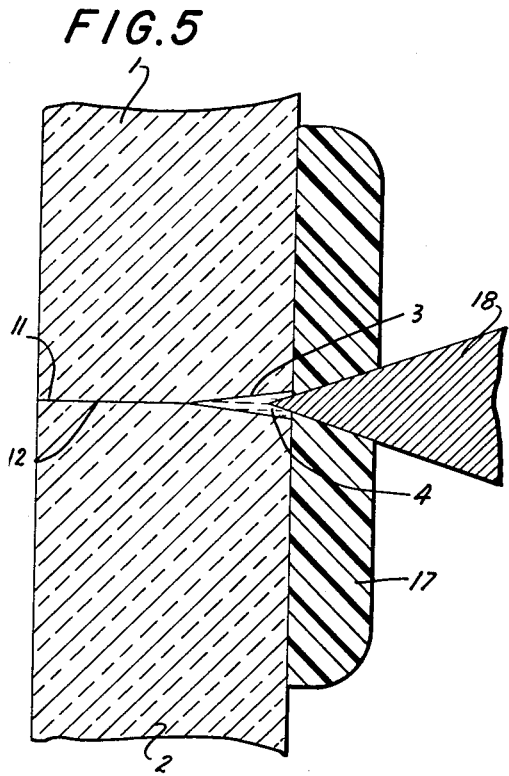

The Figure 5 shows the joint of the Fig. 4 during the demounting operation.

Figure 6:
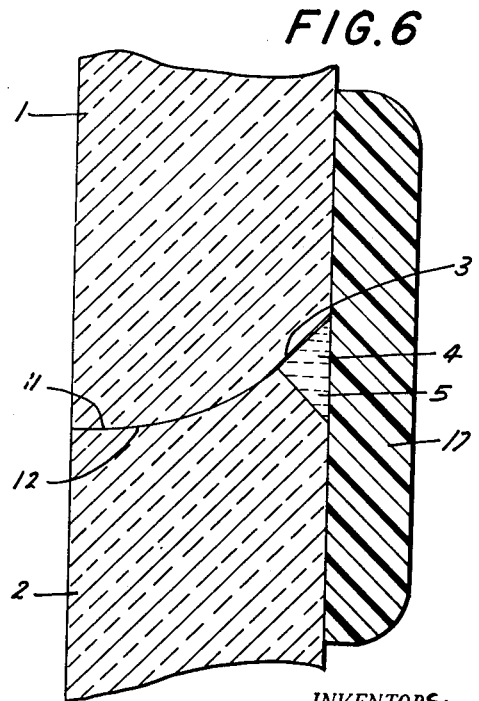

The Figure 6 is a joint of the type of that of the Fig. 4, but presenting spherical mating surfaces.

The Figures 7 and 8 show respectively in sectional view a conventional electron tube and a cathode ray tube, provided with joints according to the invention.

All the known hermetical seals between pieces of a vacuum tight envelope of an electronic tube are realized by fusing together the edges of the pieces or by using a sealing material such as mineral soft glasses called "enamels" or a metallic solder. These seals are rigid and do not allow the making of unmatched joints between rigid pieces. Moreover, such seals necessitate the use of pieces of materials able to be sealed together or the difficult choice of an enamel. These latter enamels present very high thermal expansion coefficients and are only used with pieces of particular materials.

The process of the invention uses a new technic which is not comparable with these known technics, and consists in realizing constitutive pieces of the envelope, of any gas tight materials such as glasses, ceramics, or metals, with generally no regard to the expansion coefficients of these materials. The abutting surfaces of the edges are usually made plane. These surfaces are polished to an optical degree. The lead-in wires and the electrodes are fixed to these pieces which are then assembled by bringing the polished surfaces in contact, to form an envelope. The exhaust tube of the envelope is connected to a vacuum pump. The contact of the so polished surfaces is tight enough to allow the evacuation of the assembled envelope to a very high vacuum (of the order $10^{-7}$ millimeters of mercury). This envelope is submitted to the degassing operation by raising its temperature to 400 or 450° C. while the pumping is continued. This rise of the temperature causes an expansion of the pieces. But, as it was discovered by the applicants, the said contact remains vacuum tight even if the two pieces in contact present very different expansion coefficients as for instance a piece of hard glass=$50.10^{-7}$ and a piece of metal=$100.10^{-7}$ or $170.10^{-7}$ (copper). In fact, the polished surfaces in contact glide over one another and keep the vacuum tightness of this contact.

After the degassing, and while the pumping is continued, the tube is cooled and the external surfaces of the pieces, at the vicinity of the contact of the polished surfaces, are coated with a gas tight material which ensures the permanent tightness of the joint after the sealing-off operation. This material is commonly of the "silicone" type that is, an organic-like compound of silicone. These materials are quite different from the mineral enamels which are soft glasses. The "silicones" are decomposed only at a temperature above 350° C., but withstand the maximum temperatures to which the pieces of the envelope are subjected during the operation of the tubes, that is 200° C. The chosen "silicones" are of the polymerisable type, such as the silicone resins. These materials are used in an unpolymerized state, and often, in solution in a solvent volatile liquid, so that they can be applied as a coat on the surface of the tube. This coat is submitted to drying and to a heat treatment at about 200° C. causing the polymerization of the "silicone" which forms a relatively elastic hermetic coat adhering perfectly to the surface of the pieces and keeping the tightness of the joint, even if the pieces are subjected to temperature variations which cause different expansion, and if the pieces have different thermal expansion coefficients. The tube realized by this process comprises (Fig. 1) two parts 1 and 2, this latter one comprising the exhaust tube 13. The piece 2 supports the electrodes 14 by the lead-in wires 15 and 16 which are tightly sealed in this piece 2. The edges of the pieces 1 and 2 are optically polished on the abutting surfaces 11 and 12 which are plane. A coat of a "silicone" 17 is disposed on the external surface of the pieces, around the contact of the polished surfaces 11 and 12.

Applicants have discovered that the "silicone" penetrates slightly in the contact at the vicinity of the external edges of the pieces. The Fig. 2 shows the "silicone" which has filled the small space 3 between the external parts of the edges. If the tube is to be dismounted, this presents a very great disadvantage since, after polymerization, this silicone acts as a glue and, if a cutting instrument (18, Fig. 3) is used to remove the layer 17 by cutting the same in order to allow the separation of the pieces 1 and 2, the silicone which has penetrated in the gap 3, remains and causes very serious difficulties to demount the tube. Often, the pieces break during the demounting since any parts of the contacting edges are tightly attached to one another by the silicone in the gap 3 (Fig. 2).

A very important characteristic of the invention will now be described, enabling an easy demounting of the tube.

After the degassing step, the tube is cooled and there is applied by any means a silicone oil having a very low vapour pressure (below $10^{-8}$ millimeters of mercury). This oil penetrates (see Fig. 4) in the leak 3 in the contact between the polished surfaces 11 and 12 of the edges of the pieces 1 and 2.

The external surfaces of the tube are carefully wiped so as to remove the excess of this oil. Now, as only the leak 3 is filled with this oil 4 and the adjacent surfaces of the pieces are clean, a layer of said polymerisable silicone 17 is applied around said contact and treated as above described.

The silicone 17, therefore, remains completely at the exterior of the contact and does not penetrate between the polished surfaces, since the unpolymerizable oil fills any leak 3 of the contact. If a sharp instrument (18, Fig. 5) is used to separate the parts 1 and 2, the layer 17 is cut through and the pieces 1 and 2 are easily separated. In order to facilitate this demounting process, the edges of the pieces are ground as in Fig. 6 so as to form a groove 5 surrounding the contact of the polished surfaces 11 and 12. The oil 4 is deposited in this groove and it is obvious that such groove is easily entered by a cutting instrument during the demounting.

Such joints facilitate the making of radio-tubes such as the tube shown in Fig. 7 which is of the type of the tube shown Fig. 1, but in which the joint is constituted by the contact of the polished surfaces 11 and 12, by the oil 4 surrounding said contact and by the polymerized silicone layer 17 surrounding the oil.

This technic is also used for the realization of a cathode ray tube as shown in Fig. 8 which comprises a metal bulb 22 with the exhaust tube 13 and with the deflecting electrodes $D_2$ and $D_1$ which are connected to the lead-in wires 30 and 31, an end plate of glass 23 with the fluorescent layer 44 and the electron gun. This latter comprises a cathode K, a cathode heating element F, a Wehnelt electrode N and an anode A which are fixed to a ceramic base 24 by the lead-in wires 25 to 29. This base 24 is tightly sealed to the piece 21. The plate 23, the bulb 22 and the piece 21 are assembled by two joints comprising respectively the contact between the plane polished surfaces 43 and 44, the silicone oil disposed in the grooves 72 and 71 and the polymerized silicone layers 42 and 41 covering the said grooves. This tube is realized according to the described process and it may be easily demounted as above mentioned.

The invention is not limited to the making of the tubes shown in the drawings, but any kind of electron tubes may be made according to the present invention.

It may be mentioned that the best shape for the polished contact surfaces is the plane one, since such a shape allows the surfaces to glide over each other. But spherical mating polished surfaces, as shown in Fig. 6 may also be used, especially if the parts have matched expansion coefficients. In any cases where substantially unmatched pieces and spherical contact surfaces are used, the pieces are polished with spherical surfaces of different radii and the radius of the convex surface is made smaller than the radius of the concave surface. The conical surfaces are generally avoided.

What we claim is:

1. In a high vacuum discharge tube, a demountable airtight envelope composed of at least two constitutive pieces having annular contacting highly polished edge face portions held by the vacuum within said envelope pressed against each other in gliding hermetic contact without being fused to each other; an inner annular spacing coating arranged about said annular contacting highly polished edge face portions in contact with both constitutive pieces and consisting of a material easily detachable from the same; and an outer additional airtight annular sealing coating applied to the external surface of the airtight envelope extending along and covering said inner annular spacing coating and consisting of a material firmly adhering to said constitutive pieces so as to form between said constitutive pieces a permanent seal which is spaced from said annular contacting highly polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

2. A device as defined in claim 1, wherein said contacting edge face portions are plane optically polished surfaces.

3. A device as defined in claim 1, wherein said contacting edge face portions are spherical optically polished surfaces.

4. In a high vacuum discharge tube, a demountable airtight envelope composed of at least two constitutive pieces having annular contacting highly polished edge face portions held by the vacuum within said envelope pressed against each other in gliding hermetic contact without being fused to each other; an inner annular spacing coating arranged about said annular contacting highly polished edge face portions in contact with both constitutive pieces and consisting of a material easily detachable from the same; and an outer additional airtight annular sealing coating applied to the external surface of the airtight envelope extending along and covering said inner annular spacing coating, said outer additional sealing coating being wider than said inner annular spacing coating and consisting of a material firmly adhering to said constitutive pieces so as to form between said constitutive pieces a permanent seal which is spaced from said annular contacting highly polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

5. In a high vacuum discharge tube, a demountable airtight envelope composed of at least two constitutive pieces having annular contacting highly polished edge face portions held by the vacuum within said envelope pressed against each other in gliding hermetic contact without being fused to each other; an inner annular spacing coating arranged about said annular contacting highly polished edge face portions in contact with both constitutive pieces and consisting of a permanently viscous material easily detachable from the same; and an outer additional airtight annular sealing coating applied to the external surface of the airtight envelope extending along and covering said inner annular spacing coating and consisting of a material firmly adhering to said constitutive pieces so as to form between said constitutive pieces a permanent seal which is spaced from said annular contacting highly polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

6. In a high vacuum discharge tube, a demountable airtight envelope composed of at least two constitutive pieces having opposite edge faces comprising inner annular contacting optically polished edge face portions held by the vacuum within said envelope pressed against each other in gliding hermetic contact without being fused to each other, and outer edge face portions spaced from each other so as to form an outer annular groove about said inner annular contacting edge face portions; an inner annular spacing coating arranged in said groove about said annular contacting optically polished edge face portions in contact with both constitutive pieces and consisting of a material easily detachable from the same; and an outer additional airtight annular sealing coating applied to the external surface of the airtight envelope extending along and covering said inner annular spacing coating and consisting of a material firmly adhering to said constitutive pieces so as to form between said constitutive pieces a permanent seal which is spaced from said annular contacting optically polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

7. In a high vacuum discharge tube, a demountable airtight envelope composed of at least two constitutive pieces having opposite edge faces comprising inner annular contacting optically polished edge face portions held by the vacuum within said envelope pressed against each other in gliding hermetic contact without being fused to each other, and outer edge face portions spaced from each other so as to form an outer annular groove about said inner annular contacting edge face portions; an inner annular spacing coating arranged in said groove about said annular contacting optically polished edge face portions in contact with both constitutive pieces and consisting of a permanently viscous material easily detachable from the same; and an outer additional airtight annular sealing coating applied to the external surface of the airtight envelope extending along and covering said inner annular spacing coating and consisting of a material firmly adhering to said constitutive pieces so as to form between said constitutive pieces a permanent seal which is spaced from said annular contacting optically polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

8. In a high vacuum discharge tube, a demountable airtight envelope composed of at least two constitutive pieces having annular contacting highly polished edge face portions held by the vacuum within said envelope pressed against each other in gliding hermetic contact without being fused to each other; an inner annular spacing coating arranged about said annular contacting highly polished edge face portions in contact with both constitutive pieces and consisting of a permanently viscous material easily detachable from the same; and an outer additional airtight annular sealing coating of a silicone polymer applied to the external surface of the airtight envelope extending along and covering said inner annular spacing coating firmly adhering to said constitutive pieces so as to form between said constitutive pieces a permanent seal which is spaced from said annular contacting highly polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

9. In a high vacuum discharge tube, a demountable airtight envelope composed of at least two constitutive pieces having annular contacting highly polished edge face portions held by the vacuum within said envelope pressed against each other in gliding hermetic contact without being fused to each other; an inner annular spacing coating of unpolymerizable silicone oil arranged about said annular contacting highly polished edge face portions in contact with both constitutive pieces and being easily detachable from the same; and an outer additional airtight annular sealing coating applied to the external surface of the airtight envelope extending along and covering said inner annular spacing coating and consisting of a material firmly adhering to said constitutive pieces so as to form between said constitutive pieces a permanent seal which is spaced from said annular contacting highly polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

10. In a high vacuum discharge tube, a demountable airtight envelope composed of at least two constitutive pieces having annular contacting highly polished edge face portions held by the vacuum within said envelope pressed against each other in gliding hermetic contact without being fused to each other; an inner annular spacing coating of unpolymerizable silicone oil arranged about said annular contacting highly polished edge face portions in contact with both constitutive pieces and being easily detachable from the same; and an outer additional airtight annular sealing coating of a silicone polymer applied to the external surface of the airtight envelope extending along and covering said inner annular spacing coating firmly adhering to said constitutive pieces so as to form between said constitutive pieces a permanent seal which is spaced from said annular contacting highly polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

11. In a high vacuum discharge tube, a demountable airtight envelope composed of at least two constitutive pieces having opposite edge faces comprising inner annular contacting optically polished edge face portions held by the vacuum within said envelope pressed against each other in gliding hermetic contact without being fused to each other, and outer edge face portions spaced from each other so as to form an outer annular groove about said inner annular contacting edge face portions; an inner annular spacing coating of unpolymerizable silicone oil arranged in said groove about said annular contacting optically polished edge face portions in contact with both constitutive pieces and being easily detachable from the same; and an outer additional airtight annular sealing coating of a silicone polymer applied to the external surface of the airtight envelope extending along and covering said inner annular spacing coating firmly adhering to said constitutive pieces so as to form between said constitutive pieces a permanent seal which is spaced from said annular contacting optically polished edge face portions thereof by said inner annular spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

12. The method of making a demountable airtight envelope for a high vacuum discharge tube composed of at least two constitutive pieces, comprising the steps of optically polishing opposite edge face portions of said constitutive pieces to be assembled; assembling the envelope by bringing said optically polished opposite edge face portions into direct contact; evacuating the thus assembled envelope to a high vacuum so that the contacting optically polished edge face portions of said constitutive pieces are held by said vacuum pressed against each other in gliding hermetic contact without being fused to each other; applying an inner spacing coating of easily detachable material on both said constitutive pieces about said contacting optically polished edge face portions thereof; and applying an outer airtight sealing coating to the external surface of the envelope along and covering said inner spacing coating, so as to provide a permanent seal between said constitutive pieces spaced from the contacting optically polished edge face portions thereof by said inner spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

13. The method of making a demountable airtight envelope for a high vacuum discharge tube composed of at least two constitutive pieces, comprising the steps of optically polishing opposite edge face portions of said constitutive pieces to be assembled; assembling the envelope by bringing said optically polished opposite edge face portions into direct contact; evacuating the thus assembled envelope to a high vacuum so that the contacting optically polished edge face portions of said constitutive pieces are held by said vacuum pressed against each other in gliding hermetic contact without being fused to each other; heating the envelope to a temperature below the fusing temperature of said contacting edge face portions for degassing the envelope; applying an inner spacing coating of permanently viscous material on both said constitutive pieces about said contacting optically polished edge face portions thereof; and applying an outer airtight sealing coating to the external surface of the envelope along and covering said inner spacing coating, so as to provide a permanent seal between said constitutive pieces spaced from the contacting optically polished edge face portions thereof by said inner spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

14. The method of making a demountable airtight envelope for a high vacuum discharge tube composed of at least two constitutive pieces, comprising the steps of forming the constitutive pieces with opposite edge faces having inner optically polished contact edge face portions and outer edge face portions, at least one of said outer edge face portions extending angularly away from its respective optically polished edge face portion; assembling the envelope by bringing said optically polished opposite edge face portions into direct contact and with said outer edge face portions opposite and spaced from each other so as to form an outer groove about said inner contacting edge face portions; evacuating the thus assembled envelope to a high vacuum so that the contacting optically polished edge face portions of said constitutive pieces are held by said vacuum pressed against each other in gliding hermetic contact without being fused to each other; applying an inner spacing coating of easily detachable material on both said constitutive pieces about said contacting optically polished edge face portions thereof; and applying an outer airtight sealing coating to the external surface of the envelope along and covering said inner spacing coating, so as to provide a permanent seal between said constitutive pieces spaced from the contacting optically polished edge face portions thereof by said inner spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

15. The method of making a demountable airtight envelope for a high vacuum discharge tube composed of at least two constitutive pieces, comprising the steps of optically polishing opposite edge face portions of said constitutive pieces to be assembled; assembling the envelope by bringing said optically polished opposite edge face portions into direct contact; evacuating the thus assembled envelope to a high vacuum so that the contacting optically polished edge face portions of said constitutive pieces are held by said vacuum pressed against each other in gliding hermetic contact without being fused to each other; applying an inner spacing coating of unpolymerizable silicone oil on both said constitutive pieces about said contacting optically polished edge face portions thereof; and applying an outer airtight sealing coating of a silicone polymer to the external surface of the envelope along and covering said inner spacing coating, so as to provide a permanent seal between said constitutive pieces spaced from the contacting optically polished edge face portions thereof by said inner spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

16. The method of making a demountable airtight envelope for a high vacuum discharge tube composed of at least two constitutive pieces, comprising the steps of optically polishing opposite edge face portions of said constitutive pieces to be assembled; assembling the envelope by bringing said optically polished opposite edge face portions into direct contact; evacuating the thus assembled envelope to a high vacuum so that the contacting optically polished edge face portions of said constitutive pieces are held by said vacuum pressed against each other in gliding hermetic contact without being fused to each other; heating the envelope to a temperature below the fusing temperature of said contacting edge face portions for degassing the envelope; applying an inner spacing coating of unpolymerizable silicone oil on both said constitutive pieces about said contacting optically polished edge face portions thereof; and applying an outer airtight sealing coating of a silicone polymer to the external surface of the envelope along and covering said inner spacing coating, so as to provide a permanent seal between said constitutive pieces spaced from the contacting optically polished edge face portions thereof by said inner spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

17. The method of making a demountable airtight envelope for a high vacuum discharge tube composed of at least two constitutive pieces, comprising the steps of forming the constitutive pieces with opposite edge faces having inner optically polished contact edge face portions and outer edge face portions, at least one of said outer edge face portions extending angularly away from its respective optically polished edge face portion; assembling the envelope by bringing said optically polished opposite edge face portions into direct contact and with said outer edge face portions opposite and spaced from each other so as to form an outer groove about said inner contacting edge face portions; evacuating the thus assembled envelope to a high vacuum so that the contacting optically polished edge face portions of said constitutive pieces are held by said vacuum pressed against each other in gliding hermetic contact without being fused to each other; heating the envelope to a temperature below the fusing temperature of said contacting edge face portions for degassing the envelope; applying an inner spacing coating of unpolymerizable silicone oil on both said constitutive pieces about said contacting optically polished edge face portions thereof; and applying an outer air tight sealing coating of a silicone polymer to the external surface of the envelope along and covering said inner spacing coating, so as to provide a permanent seal between said constitutive pieces spaced from the contacting optically polished edge face portions thereof by said inner spacing coating, whereby said inner coating prevents penetration of the firmly adhering material of the outer coating between the edge face portions so that the same do not adhere to each other and are easily detachable upon separation of said outer coating into parts adhering to only one or the other of said constitutive pieces.

18. The method of assembling and sealing a high vacuum discharge tube having electrodes and a demountable envelope therefor composed of at least two constitutive pieces, comprising the steps of polishing the opposed edge face portions of said constitutive pieces and thereby rendering the contact therebetween airtight while permitting gliding of one edge over the other due to unequal expansion of said constitutive pieces; evacuating the assembled envelope to a high vacuum; degassing said electrodes without fusing said constitutive pieces to each other; applying an inner easily detachable sealing material on both said constitutive pieces about said contacting edge face portions; applying an outer polymerizable sealing material adhering to the exterior of the envelope and covering said inner seal so as to provide a second seal; and heat treating said second seal to polymerize the same.

References Cited in the file of this patent

UNITED STATES PATENTS

| 1,079,804 | Sidon | Nov. 25, 1913 |
| 2,342,550 | Lemmers | Feb. 22, 1944 |
| 2,557,928 | Atkinson | June 26, 1951 |

FOREIGN PATENTS

| 391,245 | Germany | Mar. 1, 1924 |
| 631,811 | Great Britain | Nov. 10, 1949 |
| 639,206 | Great Britain | June 21, 1950 |